US009088692B2

(12) United States Patent
Carter et al.

(10) Patent No.: US 9,088,692 B2
(45) Date of Patent: Jul. 21, 2015

(54) MANAGING THE LAYOUT OF MULTIPLE VIDEO STREAMS DISPLAYED ON A DESTINATION DISPLAY SCREEN DURING A VIDEOCONFERENCE

(71) Applicant: Polycom, Inc., San Jose, CA (US)

(72) Inventors: James Carter, Cedar Park, TX (US); Arik Yaacob, Austin, TX (US); James F. Darrah, Austin, TX (US)

(73) Assignee: Polycom, Inc., San Jose, CA (US)

( * ) Notice: Subject to any disclaimer, the term of this patent is extended or adjusted under 35 U.S.C. 154(b) by 85 days.

(21) Appl. No.: 13/918,226

(22) Filed: Jun. 14, 2013

(65) Prior Publication Data

US 2013/0335506 A1 Dec. 19, 2013

Related U.S. Application Data

(60) Provisional application No. 61/659,866, filed on Jun. 14, 2012.

(51) Int. Cl.
*H04N 7/15* (2006.01)
*H04L 29/06* (2006.01)
*H04L 12/18* (2006.01)

(52) U.S. Cl.
CPC .............. *H04N 7/15* (2013.01); *H04L 12/1827* (2013.01); *H04L 65/4038* (2013.01); *H04N 7/152* (2013.01)

(58) Field of Classification Search
CPC ........... H04N 7/15; H04N 7/152; H04N 7/14; H04N 7/141; H04N 7/142; H04L 12/1827; H04L 65/4038
USPC ............................................ 348/14.01–14.16
See application file for complete search history.

(56) References Cited

U.S. PATENT DOCUMENTS

2011/0292161 A1* 12/2011 Sharon et al. ............... 348/14.07
2012/0007944 A1* 1/2012 Eisenberg et al. ......... 348/14.09
2013/0093835 A1* 4/2013 Paithankar et al. ........ 348/14.07
2013/0106988 A1* 5/2013 Davis et al. ................ 348/14.09

* cited by examiner

*Primary Examiner* — Melur Ramakrishnaiah
(74) *Attorney, Agent, or Firm* — Blank Rome, LLP

(57) ABSTRACT

A system includes a network interface for sending and receiving at least video data between two or more endpoints, where each endpoint includes a display screen. A camera may be located at more than one endpoint capturing video data. The system also includes a control unit for controlling spatial arrangement of one or more video data streams displayed on a display screen of one or more endpoints. The control unit determines a state and configuration of a videoconference and accesses a route description corresponding to the state and configuration of the videoconference. The route description includes a video data stream destination, one or more video data stream sources, and layout information determining the spatial arrangement of one or more video data streams displayed on the video data stream destination.

20 Claims, 11 Drawing Sheets

Figure 8:
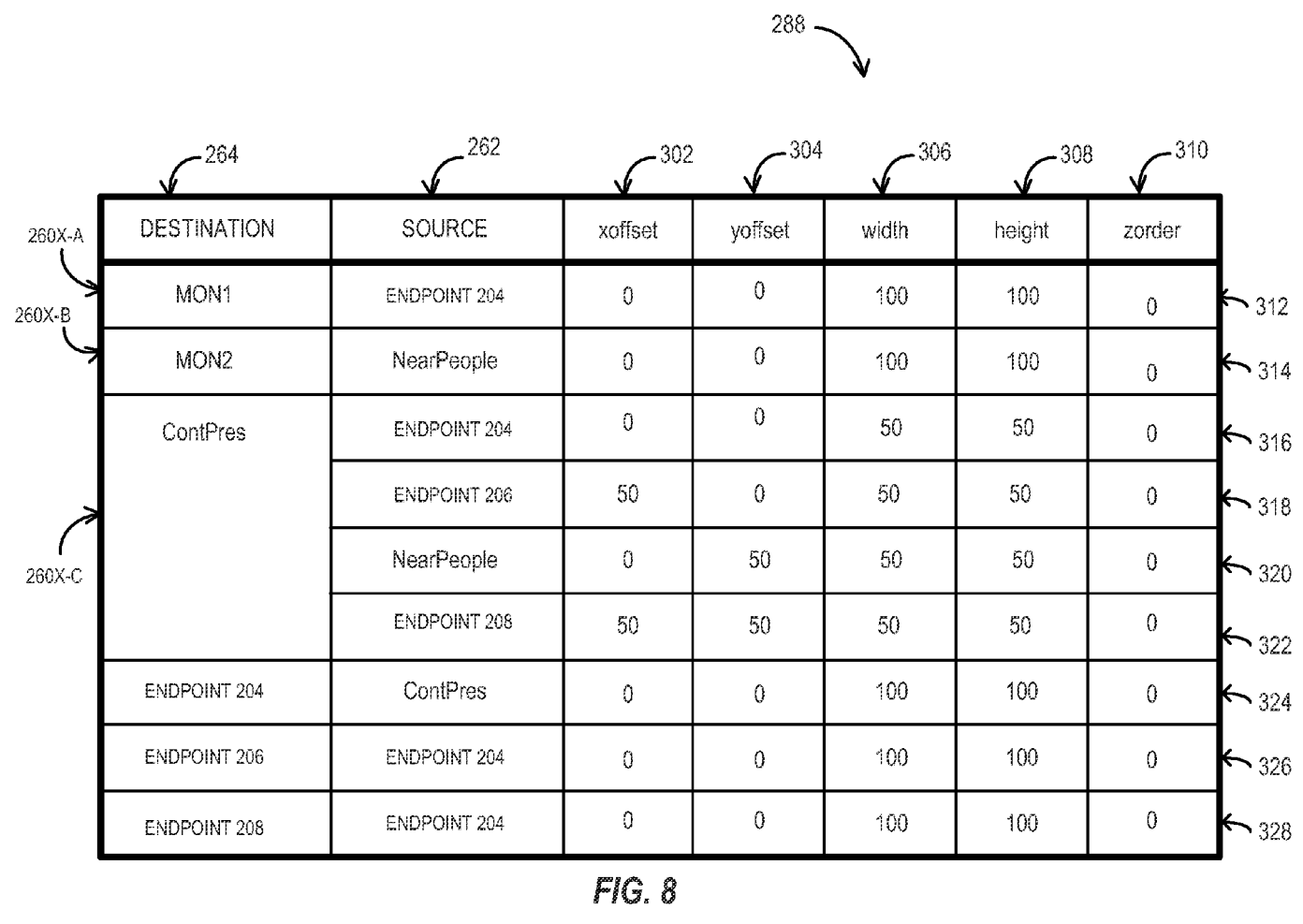

| | DESTINATION | SOURCE | xoffset | yoffset | width | height | zorder |
|---|---|---|---|---|---|---|---|
| 260X-A | MON1 | ENDPOINT 204 | 0 | 0 | 100 | 100 | 0 |
| 260X-B | MON2 | NearPeople | 0 | 0 | 100 | 100 | 0 |
| 260X-C | ContPres | ENDPOINT 204 | 50 | 0 | 50 | 50 | 0 |
| | | ENDPOINT 206 | 0 | 50 | 50 | 50 | 0 |
| | | NearPeople | 50 | 50 | 50 | 50 | 0 |
| | | ENDPOINT 208 | 0 | 0 | 50 | 50 | 0 |
| | ENDPOINT 204 | ContPres | 0 | 0 | 100 | 100 | 0 |
| | ENDPOINT 206 | ENDPOINT 204 | 0 | 0 | 100 | 100 | 0 |
| | ENDPOINT 208 | ENDPOINT 204 | 0 | 0 | 100 | 100 | 0 |

MANAGING THE LAYOUT OF MULTIPLE VIDEO STREAMS DISPLAYED ON A DESTINATION DISPLAY SCREEN DURING A VIDEOCONFERENCE

CROSS REFERENCE TO RELATED APPLICATIONS

This application claims priority to U.S. Provisional Application Ser. No. 61/659,866, filed Jun. 14, 2012, which is incorporated by reference in its entirety herein.

BACKGROUND

The present disclosure relates generally to videoconferencing systems, and more particularly, to managing the layout of multiple video streams displayed on a destination display screen during a videoconference.

Videoconferencing entails exchange of audio, video, and other information between at least two participants that are generally remotely located to one another. A videoconferencing endpoint is provided at each participant location to enable the participants to see and hear each other. The videoconferencing endpoint may include a camera for capturing video of local participants and a display device for displaying video of remote participants. The videoconferencing endpoint may also include a microphone for capturing audio signals from local participants and a speaker for converting audio signals received from the remote participants into sound. The videoconferencing endpoint may include additional display devices for displaying digital content. Where more than two endpoints participate in a videoconferencing session, a multipoint control unit (MCU) may be used to control the videoconference. The MCU may receive video, audio, and data from one or more endpoints, and then transmit the video, audio, and data to the appropriate endpoints, via a network.

FIG. 1 depicts a prior art videoconferencing system 100. The system 100 includes videoconferencing endpoints 101-105, a prior art multipoint control unit (MCU) 106, and a network 110. The network 110 may comprise a packet switched network, circuit switched network, or combinations thereof. The videoconferencing endpoints 101-105 may send and receive audio and video signals, and data. Network communication may be based on communication protocols, including H.320, H.324, H.323, and compression standards such as H.263, H.264.

The prior art MCU 106 initiates and manages videoconferencing sessions between two or more endpoints 101-105. The MCU 106 may mix audio data received from one or more endpoints 101-105, generate mixed audio data, and then send the mixed audio data to appropriate endpoints. Additionally, the MCU 106 receives one or more video streams from the endpoints and combines the video streams. The video streams are then sent by the MCU to the appropriate endpoints, to display the video streams on display screens of the endpoints.

The MCU 106 combines the video streams for display on the display screens based on a specified display layout. The display layout can be specified for various states and configurations of a videoconference call. For example, a near end display layout for a two-way call can include the video streams from a remote videoconferencing endpoint, while in a three-way videoconference call, the near end display may include various permutations and combinations of the video streams from both remote endpoints.

FIG. 2A is a flowchart for determining display layouts associated with destinations in various types of videoconferencing calls, performed by the prior art MCU 106. Changes in the state of the videoconferencing session are first detected, at step 120. For example, a change in state may be represented by a new videoconference call being initialed or if one or more endpoints joins or leaves an ongoing videoconference. If the MCU 106 detects a change in state, it then determines the type of ongoing videoconference, at step 122. If it is determined that ongoing the videoconference is a two-way videoconference, between a near end endpoint and a remote endpoint, then the MCU 106 generates two video streams, at step 124. One video stream is generated for a near end monitor MON and another video stream for a monitor at the remote endpoint EP1. The near end monitor MON receives the video stream from the remote endpoint EP1 (MON=EP1) and the remote endpoint EP1 receives the video stream from the near end endpoint MON (EP1=MON). Once it is decided where each video stream is presented, the presentation can be used to generate a display layout. The display layout specifies the spatial arrangement of the video stream, or streams, and any data stream, to be displayed on the display screens of each endpoint.

If it is determined that ongoing the videoconference is a three-way call, at step 126, the prior art MCU 106 determines the display layout and presentation, as shown in FIG. 2B. In FIG. 2B, video streams are routed between the near end monitor MON and various endpoints EP1, EP2 depending upon a current speaker (MON, EP1, EP2) 130 and a previous speaker 132, for each possibility of the current speaker. For example, if the current speaker is the near end speaker MON and the previous speaker was endpoint EP1, then the prior art MCU 106 routes the video stream from EP1 to the near end monitor MON and near end video of the current speaker MON is sent to the endpoints EP1 and EP2.

If it is determined that ongoing the videoconference is a 4-way call, at step 128 of FIG. 2A, then the number of video stream routing possibilities increases substantially, as illustrated in FIG. 2C. Video stream routing complexity is further increased with 5-way and 6-way, or higher, videoconference calls, hid tiding data content streams with the video streams during a videoconference also increases video stream routing complexity. Additionally, video stream routing complexity is increased when the multiple video streams and/or data streams are displayed at the same endpoint MON, EP1, EP2. As can be appreciated, video stream routing complexity becomes increasingly complex as the number of endpoints increases and as data streams are introduced into the videoconference.

If it is desired to change any portion of the spatial arrangement of the specified display layout of the video stream, or streams, and/or data stream displayed on the display screens of the endpoints, the changes are performed at the code level, to allow the prior art MCU 106 to generate the desired display layouts. Changes to the code necessitate recompiling of the code for the changes to take effect. Incorporating changes and recompiling the code is often beyond the skills of most end users. Additionally, modifications to the code may inject bugs or other errors into the system, which may be hard to detect and cause multiplicative ill-effects to the system.

SUMMARY

In one general embodiment, a system includes a network interface for sending and receiving at least video image data between two or more endpoints, each endpoint includes a display screen. The system also includes a control unit for controlling spatial arrangement of one or more video image data streams displayed on the display screen of one or more endpoints. The control unit determines astute and configuration of an ongoing videoconference and accesses a route description corresponding to the state and configuration of the ongoing videoconference. The route description includes a video image data stream destination, more than one video image data stream source, and layout information determining the spatial arrangement of one or more video image data streams displayed on the video image data stream destination.

In another general embodiment, a control unit comprises an interface for sending and receiving at least video data between two or more endpoints over a network and a control unit for controlling spatial arrangement of more than one video data stream displayed on the display screen of one or more endpoints. The control unit determines a state and configuration of an ongoing videoconference and accesses at least one route description corresponding to the state and configuration of the ongoing videoconference. The route description comprises a video data stream destination, more than one video data stream source, and a layout description determining the spatial arrangement of more than one video data stream displayed on the destination.

In further general embodiment, a method that comprises operating a programmed processor to determine at least one of state and configuration of an ongoing videoconference, then accessing one or more route descriptions stored in a memory operatively coupled to the programmed processor and corresponding to the determined state and configuration of the ongoing videoconference, a route description comprising at least one video data destination, one or more video data stream sources, and spatial arrangement of one or more video data streams displayed on the destination. The method continues with sending instructions to cause the display of one or more video data streams at the destination corresponding to the determined state and configuration of the ongoing videoconference.

BRIEF DESCRIPTION OF THE DRAWINGS

FIG. 8 illustrates, in tabular format, an output of layout translation logic.

DETAILED DESCRIPTION

The following description is made for the purpose of general illustration and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
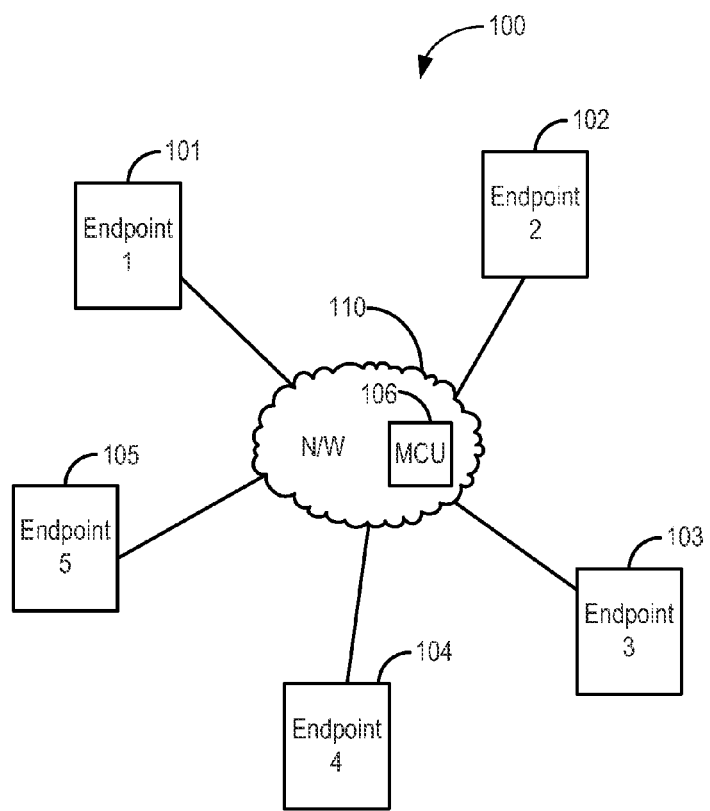
FIG. 1 illustrates a Prior Art videoconferencing system.
Figure 2A:
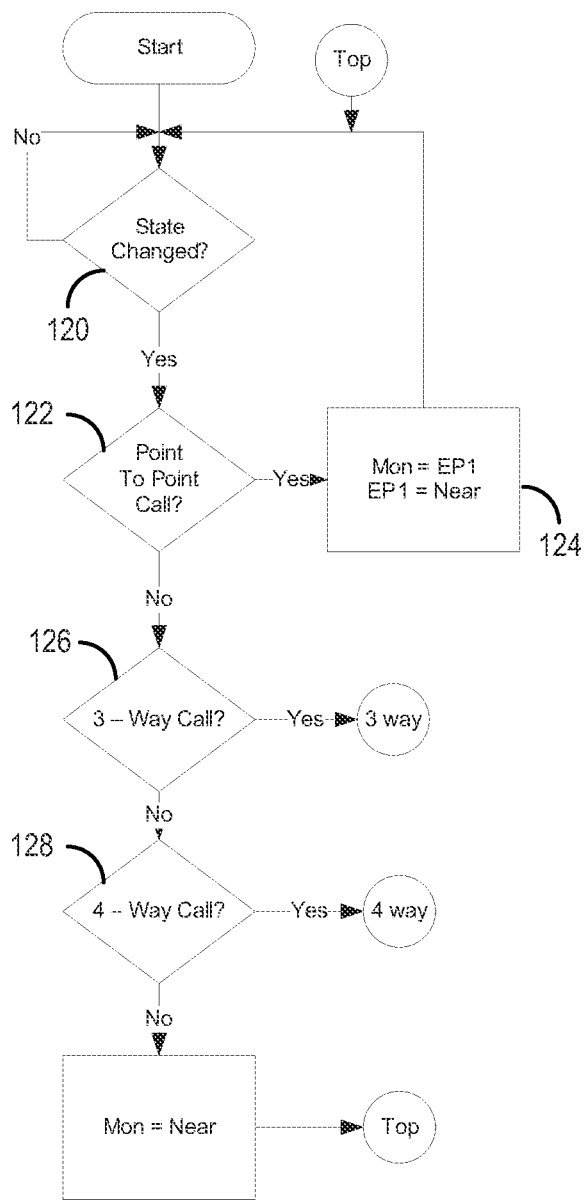
FIGS. 2A-2C illustrate Prior Art processes for determining display layouts in a videoconference.
Figure 2B:
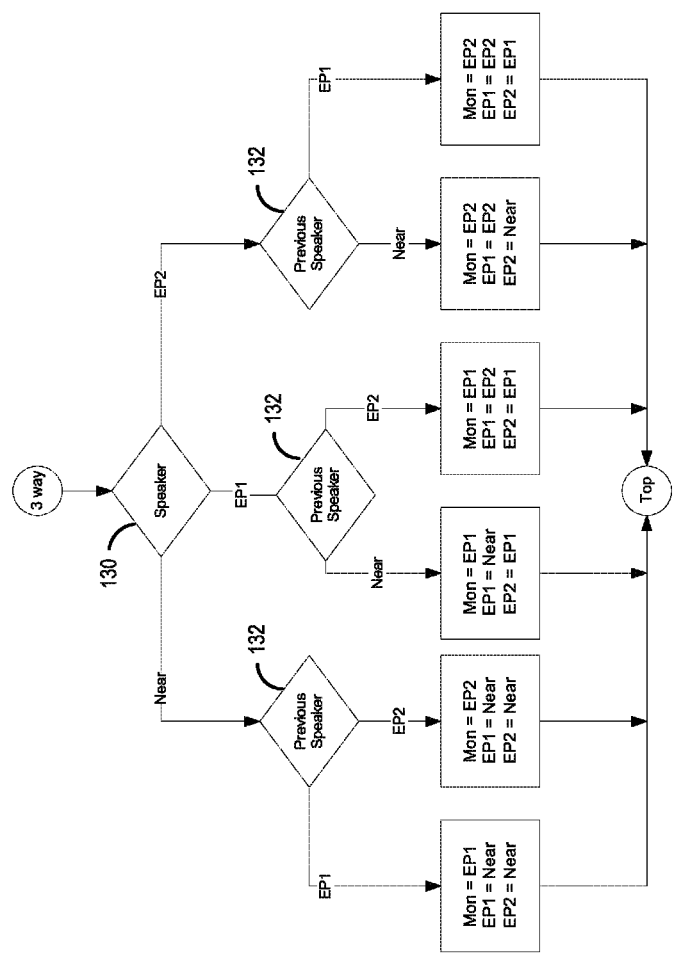
Figure 2C:
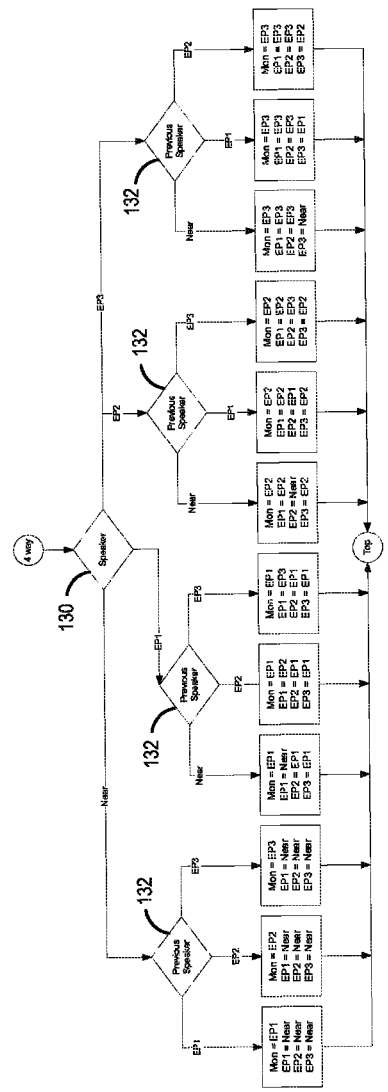
Figure 3:
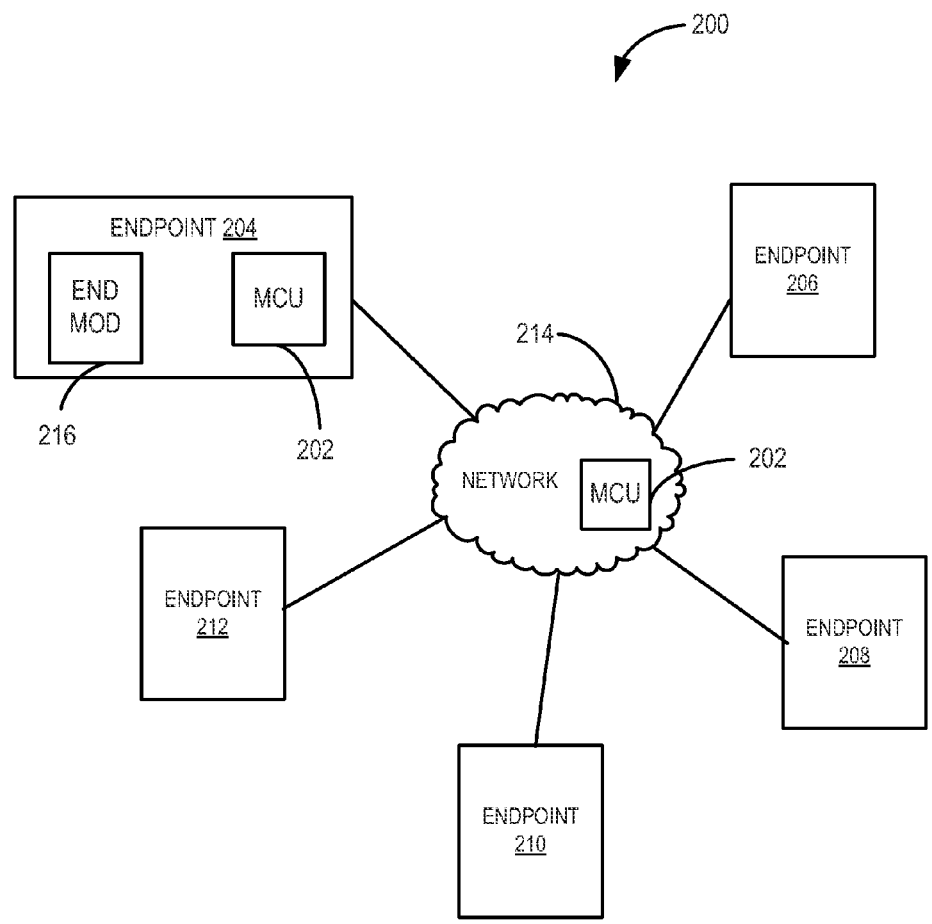
FIG. 3 illustrates a simplified block diagram of an embodiment of a system for managing the layout of one or more video streams displayed on a destination display screen during a videoconference.

As illustrated in FIG. 3, there is shown generally at 200, an embodiment of a videoconferencing system that manages the presentation layout of one or more video streams displayed on a destination display screen during a videoconference. In a general embodiment, the system 200 includes at least one multipoint control unit (MCU) 202 that controls communications between multiple endpoints 204-212 over one or more networks 214. In some embodiments, there may be more than one MCU 202 in the system 200. The multipoint control unit (MCU) 202 controls the spatial arrangement of one or more video streams, and any data stream, received from one or more video sources and displayed on display screen of one or more endpoints.

In the embodiments, the network 214 may take any form including, but not limited to, a local area network (LAN), a wireless network, or a wide area network (WAN) such as the Internet, peer-to-peer network, etc. Additionally, the network 214 may comprise both LAN and WAN networks, where the WAN provides connectivity between remotely located LAN networks 214. Network communication between the endpoints 204-212 may be based on communication protocols, including H.320, H.324, H.323, and compression standards such as H.263, H.264.

Figure 4:
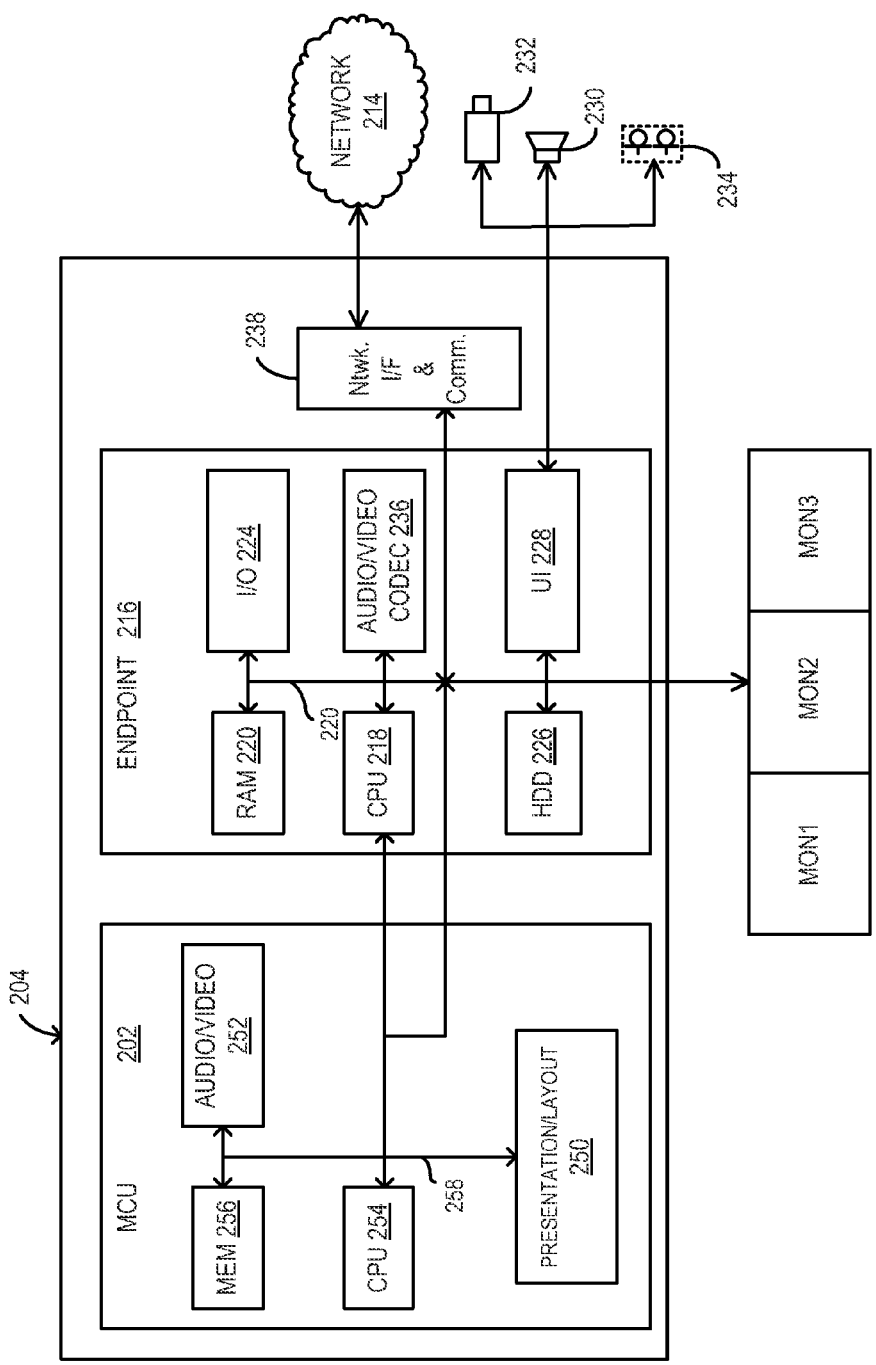
FIG. 4 illustrates a simplified block diagram of an exemplary embodiment of an endpoint of the system of FIG. 3.

Referring to FIG. 3 and FIG. 4, the videoconferencing system 200 includes one or more multipoint control units (MCU) 202 for controlling the display of one or more video streams, and optionally one or more data streams, on one or more display screens MON1-MON3 of one or more endpoints 204-212. In some embodiments, an MCU 202 may be included in one or more endpoints 204-212 of the system 200. Inclusion of an MCU 202 in an endpoint 204 may allow the endpoint to initiate, control, and maintain a videoconference, as well as provide endpoint videoconferencing functionality. In some embodiments, one or more MCUs 202 may be located external to any endpoint 204-212 and may be located wherever desired within the system 200. In such an embodiment, an MCU 202 may comprise a standalone entity that communicates with the endpoints 204-212 over the network 214.

FIG. 4 illustrates an embodiment of an endpoint 204 that includes both an MCU 202 and an endpoint module 216. It is to be understood that the exemplary endpoint 204 shown in FIG. 4, which includes both the endpoint module 216 and MCU 202, may comprise any endpoint 204-212 desired in the system 200, and may comprise more than one endpoint 204-212. An exemplary endpoint module 216 may typically include a central processing unit 218, such as a microprocessor, and a number of other units interconnected via a system bus 220. In some embodiments, the endpoint module 216 may further include a Random Access Memory (RAM) 222, an I/O adapter 224 for connecting peripheral devices such as a disk storage unit 226 to the bus 220, a user interface adapter 228 for connecting user interface devices such as a speaker 230, camera 232, a microphone 234 which may comprise a microphone array, and keyboard, mouse, and/or other user interface devices (not shown) to the bus 220. The endpoint 204 may additionally include visual means, such as display monitors MON1-MON3 coupled to the bus 220, for providing status indications and other videoconferencing related data to a user.

In the embodiments, a camera 232 may be provided at each endpoint 204-212 for capturing near end endpoint video during a videoconference session for generating a video stream. The camera 232 may comprise a pan-tilt-zoom (PZT) camera, with the orientation, positioning and repositioning, and settings thereof controlled by the processor 218 and/or user via the user interface 228. The processor 218 may control the display settings of the monitors MON1-MON3 of the near end endpoint 204. The processor 218 receives data from the user, via the user interface 228, and processes the data for controlling the endpoint module 216 and, optionally, the MCU 202.

In the embodiments, each endpoint 204-212 may further be configured with audio and video codec module 236. The audio and video codec module 236 may include audio and video encoders and decoders and communication protocols. The codec module 236 may include audio codecs such as MPEG, G.722, and video codecs such as MPEG-4, H.264, as well as other audio and video codecs. The audio component of the audio and video codec module 236 encodes audio signals received from the microphone 234 and generates audio streams. The audio component of the audio and video codec module 236 also decodes audio streams received from either the MCU 202 or from far end endpoints 206-212, via the network 214, for reproduction of sound by the speaker 230.

The video component of the audio and video codec module 236 encodes video streams captured by the camera 232 and generates video streams for transmission over the network 214 by the MCU 202. The video component of the audio and video codec module 236 also decodes received video streams from far end endpoints 206-212 for displaying content received from far end endpoints on the one or more monitors MON1-MON3 of an endpoint. In some embodiments, the audio and video streams generated by the audio and video codec module 236 are sent to the MCU 202 prior to transmitting the audio and video streams to far end endpoints 206-212 over the network 214, in other embodiments, the audio and video streams generated by the audio and video codec module 236 are sent directly to far end endpoints 206-212 over the network 214.

Each endpoint 204-212 may optionally include a network interface and communication module 238. The network interface and communication module 238 may comprise known software and firmware that facilitates network communication as known in the art.

In one or more embodiments, the MCU 202 initiates, controls, and maintains videoconference sessions that include the near end endpoint 204 and one or more far end endpoints 206-212 over the network 214. The MCU 202 may include components described in the ITU-T H.323 multimedia communications protocol standard specification, of ITU New York, N.Y. The MCU 202 may include a presentation and layout manager 250, shown in FIG. 5. The presentation and layout manager 250 determines how more than one video stream, and any data stream, from an ongoing videoconferencing session are presented to far end endpoints 206-212 and to the near end endpoint 204 on monitors MON1-MON3. The presentation and layout manager 250 determines how video streams from an ongoing videoconference are presented, based on the current state and configuration of the videoconference, external commands, and external definition files, thoroughly discussed hereinafter.

The MCU 202 may include an audio and video component 252. The audio and video component 252 receives data and instructions from the presentation manager 250, for mixing audio and video signals to generate audio and video streams. The audio and video streams are then sent to the appropriate endpoints 204-212. The audio and video component 252 may include various audio and video codecs for encoding and decoding audio and video streams received from various endpoints participating in a videoconferencing session, such as those discussed above.

In some embodiments, the MCU 202 may optionally include an MCU central processing unit 254 for processing data and a MCU Random Access Memory 256 for storing data that are interconnected via a system bus 258. The MCU processor 254 may control the operation of the MCU 202, including communications between the endpoint module 216 and the MCU 202, and other endpoints 206-212 over the network 214. In optional embodiments, the MCU processor 254 may include the functionality of the endpoint processor 218 for controlling the endpoint module 216 and entirety of the endpoint 214. Thus, the MCU processor 254 and the endpoint processor 218 may be implemented on the same processor device. The MCU processor 254 communicates with the user interface 228 to receive MCU related commands from the user and present to MCU related data to the user, via the monitors MON1-MON3. The MCU memory 256 may comprise either volatile or nonvolatile memory, or both.

Figure 5:
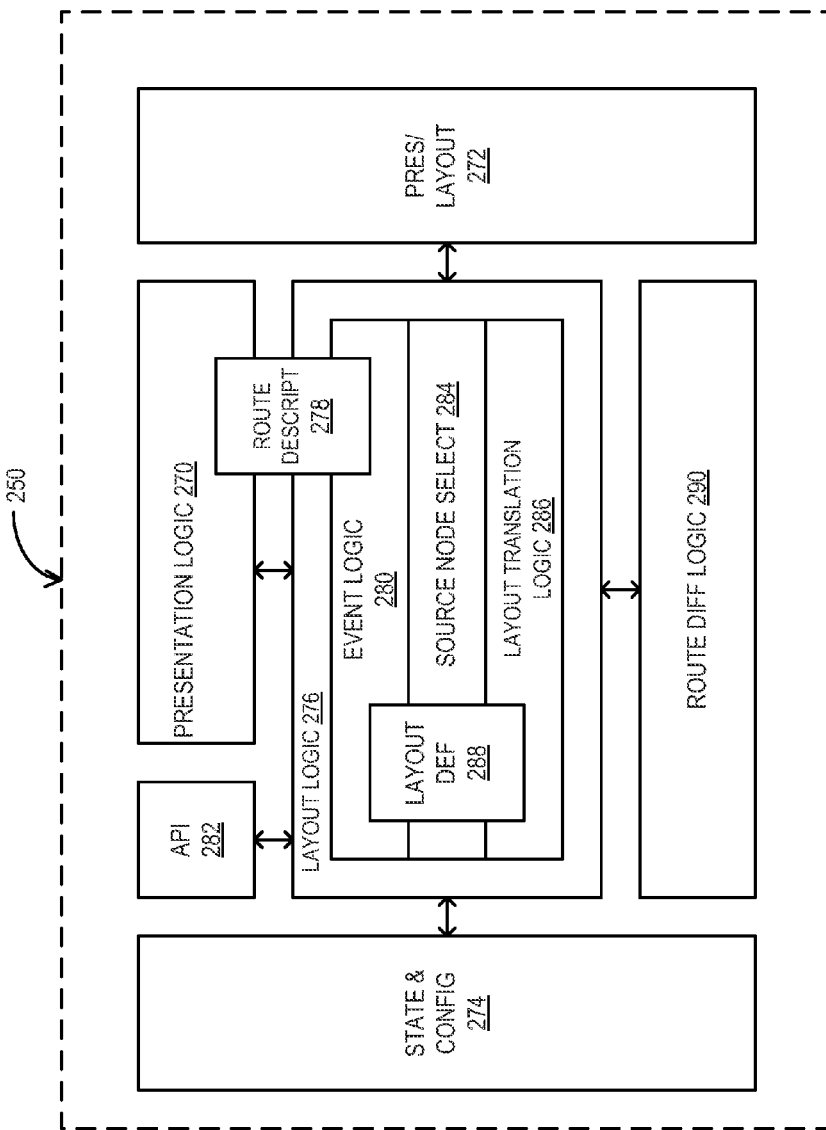
FIG. 5 illustrates a simplified block diagram of an exemplary embodiment of a presentation and layout manager.

Referring to FIG. 4 and FIG. 5, the presentation and layout manager 250 utilizes a logic module approach for determining videoconferencing layouts. The manager 250 may include up to several logical tiers that process presentation and layout data for generating layouts for each endpoint 204-212 participating in a videoconferencing session. Hereinafter, a logical or physical entity that either provides a video source or video sink in the system 200 is referred to as a node. For example, the camera 232 captures near end endpoint video during a videoconference session, and is therefore a video source and a source node. Video from the camera 232 is sent to other endpoints 206-212 for display on monitors MON1-MON3. Therefore, monitors MON1-MON3 are video sinks and sink nodes. In the embodiments, the presentation and layout manager 250 determines the spatial arrangement of video streams received from one or more source nodes for displaying one or more video streams on a sink node. As used herein, "layout" is the spatial arrangement of one or more video streams as they are simultaneously displayed on a sink node. In the embodiments, the presentation and layout manager 250 may generate one or more routes for each sink node.

Figure 6:
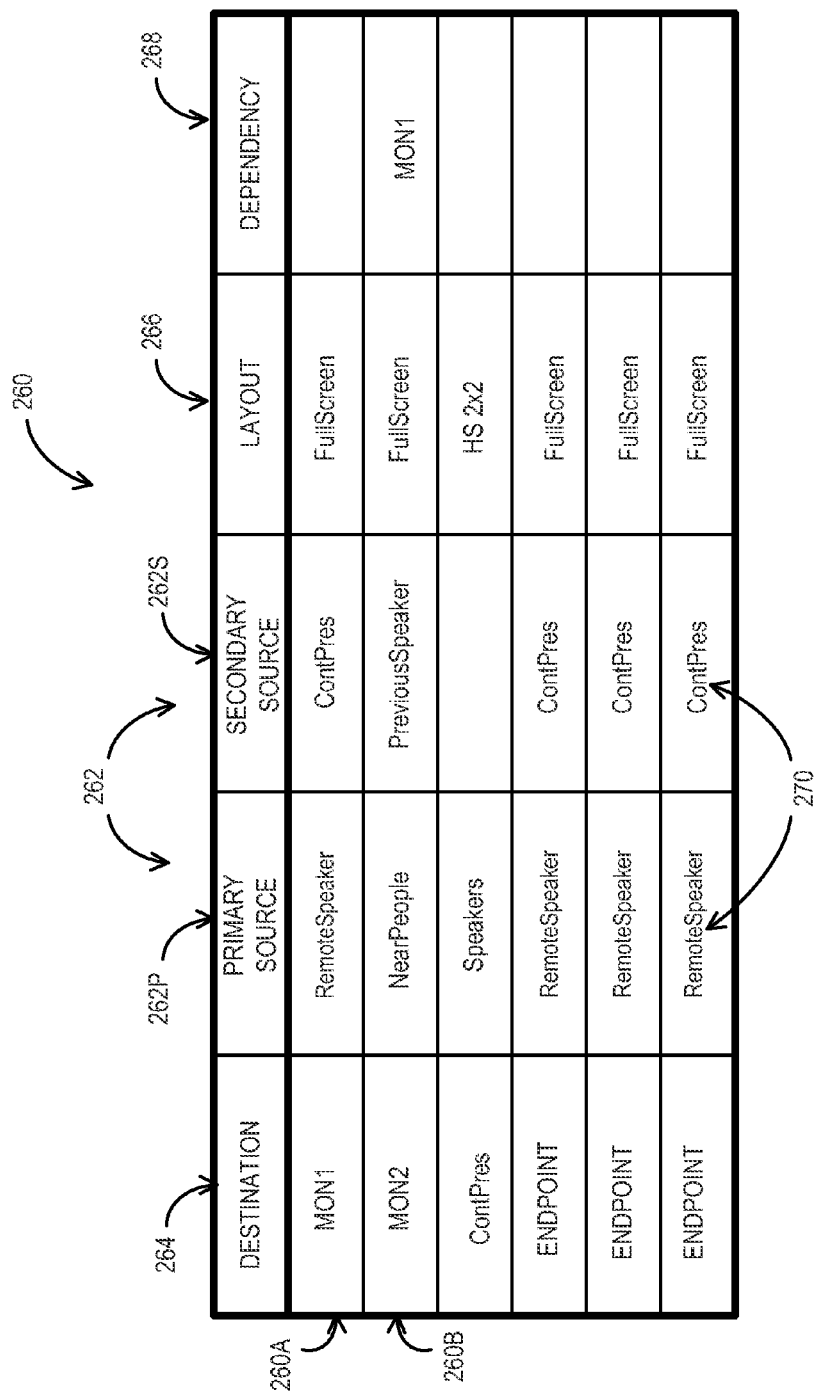
FIG. 6 illustrates, in tabular format, exemplary route descriptions of the system.

As illustrated in FIG. 6, there is a table of exemplary "routes," also referred to hereinafter as "route descriptions," shown generally at 260. A route 260 comprises a description of how one or more video streams received from one or more source nodes 262 are displayed on a sink node 264. In the embodiments, an exemplary route description 260 may include a list of source nodes 262 whose video streams are displayed on a sink node 264, a layout label 266 which specifies the layout of video streams displayed on the sink node 264, and optionally, one or more dependencies 268. In the embodiments, source nodes 262 in the route descriptions 260 are given an arbitrary source node label 270. The source node label 270 may comprise any user-created arbitrary label, such as "RemoteSpeaker," "ContPress," "NearPeople," "Speakers," and so forth that describes one or more source nodes 262 as desired by the user. Any source node 262 in the system 200 may be assigned any source node label 270 depending upon a current state and configuration of the system 200. For example, the RemoteSpeaker label 270 may be assigned to any far end endpoint 206-212 currently participating in a videoconferencing session. Assigning arbitrary labels 270 to the source nodes 262 obviates the need for changing, updating, or generating a new route description 260 each time a source node 262 for a source node label 270 is changed, as was common to the prior art.

An exemplary route description 260A is shown for sink node 264 monitor MON1. The route description 260A specifies a primary source node 262P given the source node label 270 "RemoteSpeaker." Primary source node 262P RemoteSpeaker may comprise a video stream of a speaker (not shown) captured by the camera 232 at a far end endpoint 204 of the system 200, shown in FIG. 3. The secondary source node 262S is given the source node label 270 "ContPres," which indicates a continuous presence display from available video streams from each far end endpoint 206-212 is also displayed on monitor MON1. The layout label 266 of the route description 260A indicates how available video streams from each far end endpoint 206-212 are displayed on sink node 264 monitor MON1. In the exemplary route description 260A, the layout label 266 shows "FullScreen" which indicates that an available video stream is displayed full screen on the monitor MON1.

An exemplary route description 260B for monitor MON2 indicates a primary source node 262P with the source node label 270 "NearPeople," where NearPeople may comprise a video stream of one or more persons captured by the camera. 232 at the near end endpoint 204. The secondary source node 262S is "PreviousSpeaker," which indicates the video stream may be from a far end endpoint 206-212 where the person speaking previously is located. The layout label 266 is shown indicating that video streams displayed on monitor MON2 are displayed full screen. As shown, the dependency 268 in the route description 260B indicates that the source node 262 for Monitor MON2 is based on the selection of the source node 262 of monitor MON1. If, for example, the source node 262 selected for monitor MON1 is the primary source node 262P (RemoteSpeaker), then the primary source node 262P (NearPeople) is also selected for monitor MON2. Analogously, if the source node 262 selected for monitor MON1 is the secondary source node 262S (ContPres), then the secondary source node 262S (PreviousSpeaker) is also selected for monitor MON2.

Referring again to FIG. 4 and FIG. 5, in the embodiment shown, the presentation and layout manager 250 includes presentation logic 270 coupled to a presentation/layout data module 272 and to a state and configuration data module 274 via a layout logic tier 276. A current state and configuration of an ongoing videoconferencing session is stored in the state and configuration data module 274. In addition to the current state and configuration, the state and configuration data module 274 stores system states that relate to videoconferencing sessions, including "idle," "active," "sleep," and other states common to videoconferencing. If one or more actions occurs during an ongoing videoconference, such as an endpoint 206-212 joining or leaving, or changing the status of a data content stream during the videoconference, the state and configuration of the videoconference is changed. If a change in the state and configuration of an ongoing videoconference occurs, the change is stored in the state and configuration data module 274 and the presentation logic 270 is notified to access the route descriptions 260 which correspond to the changed state and configuration.

In some embodiments, the presentation/layout data module 272 comprises a searchable file where the route descriptions 260 are stored. The presentation/layout data module 272 may be generated by the presentation and layout manager 250 and be searched and accessed by the presentation logic 270. The route descriptions 260 may be easily readable and modifiable by the user. Changes made by the user to the route descriptions 260 do not modify computer code, and thus do not require a recompile of code implementing the presentation and layout manager 250. The user interface 228 may be configured to allow the user to affect changes to the presentation/layout data module 272.

The exemplary route descriptions 260 comprising the presentation/layout data module 272 may be generated and maintained using any suitable source code. The presentation/layout data module 272 may comprise a markup language, or any scheme, which enables the user to modify route descriptions 260 and layout labels 266. Optionally, the presentation/layout data module 272 may be written in extensible markup language (XML). The presentation/layout data module 272 may additionally include layout labels 266. The layout labels 266 indicate the minimum and maximum number of sources, video and data, that can be included in a FullScreen layout, for a particular sink node 264. Layout data, discussed hereinafter, specifies the coordinates, offsets, width, height, and Z-order of the one or more video streams displayed on a sink node 264.

As illustrated in to FIG. 5, once the appropriate route descriptions 260 are selected, a route descriptions module 278 can be updated with the selected route descriptions 260. The presentation logic 270 can then send on the route descriptions 260 to the layout logic tier 276, via the route descriptions module 278. The layout logic tier 276 receives and translates the route descriptions 260 into specific source nodes 262 and layout coordinates based on the current state and configuration of the videoconferencing session.

The layout logic tier 276 can include an event logic 280, which passes the route descriptions 260 to lower tiers of the layout logic tier 276, based on the current state of the system 200 and API calls 282, via the user interface 228. The event logic 280 can check for user overrides received via API calls 282. If a user override is received, one or more route descriptions 260 updated by the presentation logic 270 may be overridden. For example, if a received user override specifies that the monitor MON1 sink node 264 is to display the video stream from the primary source node 262P RemoteSpeaker, then the event logic 280 sends any updates to the route definition 260A for monitor MON1 to the lower tiers of the layout logic tier 276. Similarly, if the state and configuration data module 274 indicates that the state of the system 200 is idle, then the event logic 280 may send only those route descriptions 260 that correspond to the state being idle to the lower tiers of the layout logic tier 276.

The lower tiers of the layout logic tier 276 may comprise source node selection logic 284 and layout translation logic 286. In some embodiments, the source node selection logic 284 converts the source node labels 270 in the route descriptions 260 into the source nodes 262 currently being used. The source node selection logic 284 receives a list of active source nodes, such as one or more cameras 232 at one or more far end endpoints 206-212 recording video, from the state and configuration data module 274.

Figure 7:
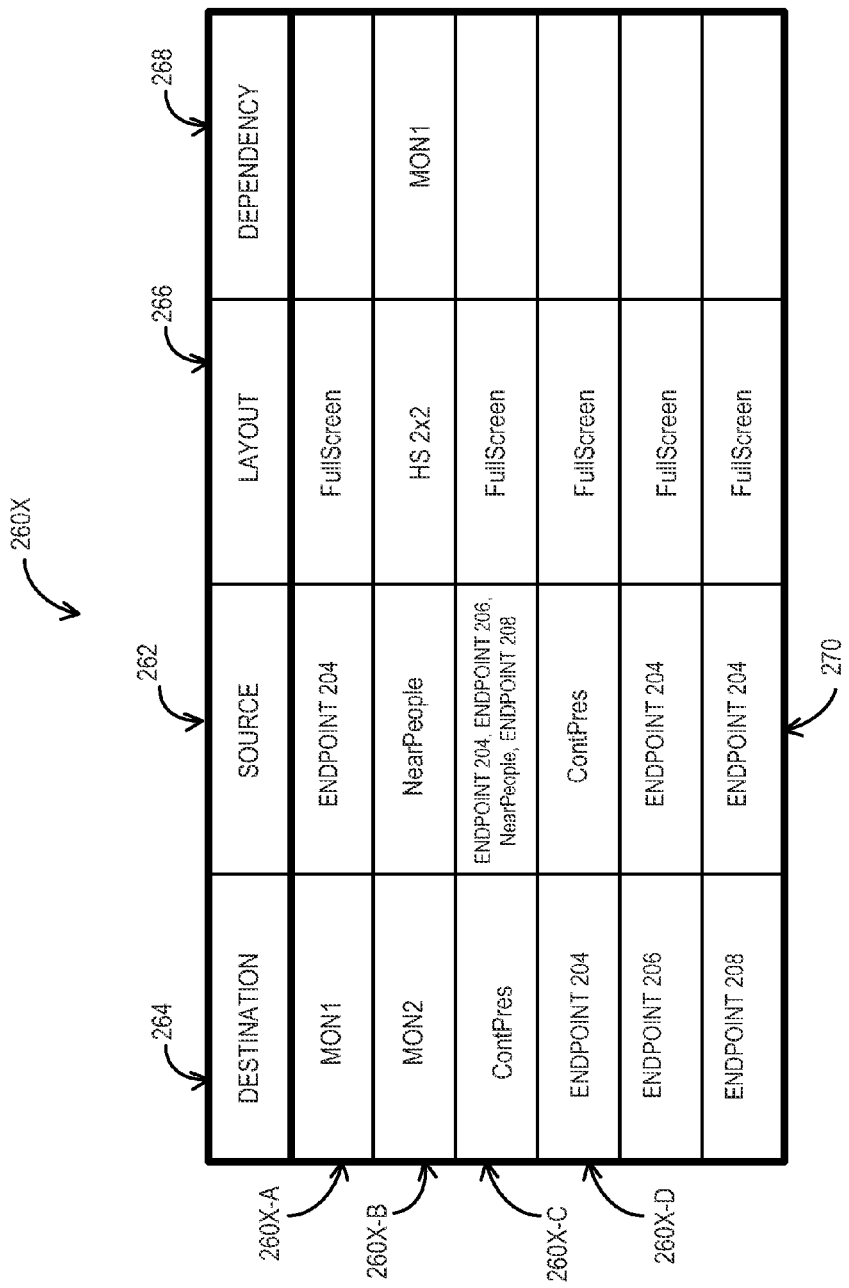
FIG. 7 illustrates, in tabular format, an output of source node selection logic of an embodiment of the system.

Referring to the Figures, and particularly to FIG. 7, the source node selection logic 284 generates updated route descriptions 260X, received from the state and configuration data module 274. As noted above, the state and configuration data module 274 monitors the current state and configuration of an ongoing videoconferencing session. If a change in the state and configuration of an ongoing videoconference occurs, the node selection logic 284 receives the updated state and configuration of the ongoing videoconferencing, via the layout logic tier 276. The source node selection logic 284 generates an updated route description 260X, where the arbitrary source node labels 270 for the source nodes 262 are replaced with actual endpoints capturing video streams. The source node selection logic 284 also resolves the selection between the primary source 262P and the secondary source 262S (shown in FIG. 6), resulting in route description 260X having a single source node 262 specified for each sink node 264.

For example, video streams are received by the source node selection logic 284 from the state and configuration data module 274 in the following order: endpoint 204, endpoint 208, NearPeople, and endpoint 206. As the video stream from endpoint 204 is the first video stream received from a source node 262, the source node selection logic 284 generates an updated route description 260X-A for monitor MON1, where the arbitrary source node label 270 "RemoteSpeaker" (shown in FIG. 6) for the source node 262 is replaced with the actual endpoint, endpoint 204 capturing the video stream. The layout label 266 of the updated route description 260X-A indicates that available video streams are displayed full screen on the monitor MON1. As shown, the exemplary updated route description 260X-A for monitor MON1 does not have any dependencies 268.

Similarly, an exemplary route description 260X-B for monitor MON2, indicates that the source node 262 remains NearPeople and the layout label 266 of the updated route description 260X-B indicates that available video streams are displayed with coordinates for each source such as HS2x2, or other arbitrary coordinates. As shown, the route description 260X-B indicates that the source node 262 for monitor MON2 is has a dependency 268, based on the selection of the source node 262 of monitor MON1.

In the updated route description 260X-C for sink node 264 ContPres, which provides continuous presence video streams, primary source 262S of with the arbitrary source node label 270 "Speakers" (shown in FIG. 6) is replaced with a source node 262 of the actual endpoints, endpoint 204, endpoint 208, NearPeople, and endpoint 206 capturing the video streams. The node selection logic 284 also resolves any invalid entries that may appear in the updated route descriptions 260X. For example, in the updated route description 260X-D for sink node 264 endpoint 204, the arbitrary source node label 270 "RemoteSpeaker" (shown in FIG. 6) is invalid, because the current speaker is endpoint 204. Therefore, the node selection logic 284 selects the secondary source, ContPres (continuous presence) as the source for endpoint 204.

As illustrated in FIG. 5 and FIG. 8, the layout translation logic 286 receives the updated route descriptions 260X, including the layout labels 266 modified by the node selection logic 284, and replaces the layout labels with actual layout data coordinates to generate layout definitions, shown generally at 288. In some embodiments, the layout translation logic 286 accesses layout coordinates from the presentation/layout data module 272. FIG. 8 shows the layout translation logic 286 has layout labels 266, such as FullScreen and HS2x2, with coordinates for each source node 264. Layout variables are shown in columns 302-310 and layout coordinates 312-328 are shown in rows in the Figure. Exemplary variables may include X-offset 302, Y-offset 304, width 306, height 308, and Z-order 310, among other variables. Thus, in the route description 260A and updated route description 260X-A, for sink node 264 monitor MON1, the layout label 266 "FullScreen," of FIGS. 6 and 7, is replaced by coordinates of: X-offset=0, Y-offset=0, width=100, height=100, and a Z-order=0, thus indicating that a current video stream displayed on sink node 264 monitor MON1 is displayed at maximum width and maximum height, with no X-axis or Y-axis offset, and is displayed full screen on the monitor MON1. Z-order=0 indicates that the video stream displayed is first in order.

In the updated route description 260X-C for sink node 264 ContPres: endpoint 204 has coordinates of: X-offset=0, Y-offset=0, width=50, height=50, and a Z-order=0, indicating that a current video stream displayed on sink node 264 monitor ContPres is displayed at approximately ½ width and ½ height, with no X-axis or Y-axis offset. Additionally, endpoint 206 has coordinates of: X-offset=50, Y-offset=0, width=50, height=50; NearPeople has coordinates of: X-offset=0, Y-offset=50, width=50, height=50; and endpoint 208 has coordinates of: X-offset=50, Y-offset=50, width=50, height=50, the totality of the coordinates for the video stream from each source node endpoint 204, endpoint 208, NearPeople, and endpoint 206, define the layout for the video streams to be displayed on sink node 264 monitor ContPres.

The layout translation logic 286 then sends layout definitions 288 to route difference logic 290, shown in FIG. 5, which maintains the current routes descriptions 260X and layout definitions 288 of the system 200. The route difference logic 290 checks the current layout definitions 288 to determine if the layout definitions 288 require updating. If any changes are detected, then the route difference logic 290 transmits the updated layout definitions 288 to the audio and video component 252, shown in FIG. 4. The audio and video component 252 mixes the layout definitions 288 and generates outgoing video streams for each of the sink nodes 264 specified in the layout definitions 288. The audio and video component 252 also sends the video streams to the appropriate sink node 264 via the network interface and communication module 238 or to one or more monitors MON1-MON3. The audio and video component 252 also mixes the audio signals of all source nodes 262 for a sink node 264 and transmits the audio streams along with the video stream to the corresponding sink node 264.

Figure 9:
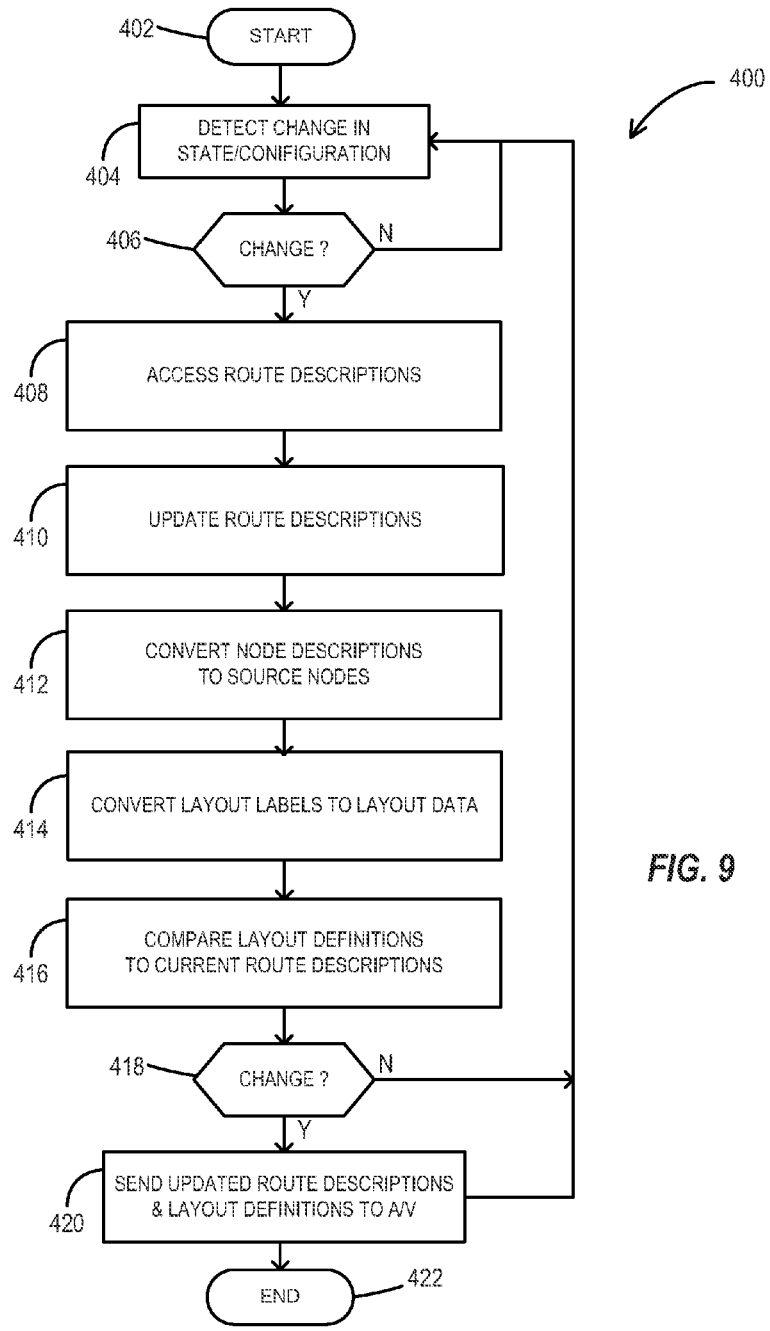
FIG. 9 is a flowchart showing an exemplary method for managing the layout of multiple video streams displayed on a destination display screen during a videoconference.

FIG. 9 illustrates an exemplary method, shown generally at 400, for generating and managing the layout of more than one video stream displayed at least one sink node participating in a videoconferencing session. As an option, the method 400 may be carried out in the context of the architecture and environment the Figures, and particularly to FIGS. 3-5 of the Figures. However, the method 400 may be carried out in any desired environment. The method 400 commences in operation 402. In operation 404 control unit (MCU) 202 detects any state or configuration changes in the system 200. The MCU 202 receives state and configuration changes from the state and configuration data module 274. In operation 406 it is determined if a change state and configuration is detected. If a change in state and configuration is not detected, the method 400 returns to operation 404. If a change in state and configuration is detected, the method 400 continues to operation 408.

In operation 408, in some embodiments, the presentation logic 270 accesses route descriptions 260 from the presentation/layout data module 272 that correspond to the current state and configuration of the system 200. In operation 410, the presentation logic 270 generates updated route descriptions 260X based on the data from the presentation/layout data module 272. In operation 412, the source node selection logic 284 converts source node descriptions in the route descriptions 260 into actual source nodes, updates the route descriptions, and transmits the updated route descriptions 260X to a layout translation logic 286.

The method 400 continues in operation 414 where, the layout translation logic 286 converts layout labels 266 into layout data coordinates to generate layout definitions 288. Subsequently, the route difference logic 290 compares the layout definitions 288 generated by the layout translation logic 286 to current route descriptions 260X and layout definitions 288, in operation 416. In operation 418, it is determined if the layout definitions 288 generated by the layout translation logic 286 match the current route descriptions 260X and layout definitions 288. If there is a match, then the method 400 returns to operation 404. If the layout definitions 288 generated by the layout translation logic 286 do not match the current route descriptions 260X and layout definitions 288, the method 400 continues to operation 420. In operation 420, the route difference logic 290 transmits the updated route descriptions 260X and layout definitions 288 to the audio and video component 252 for generating new video and audio streams and/or modifying existing video and audio streams displayed on one or more sink nodes 264. The method 400 ends in operation 422.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A system comprising:
a network interface for sending and receiving at least video image data between two or more endpoints; and
a control unit for controlling spatial arrangement of one or more video image data streams sent or received via the network interface to be displayed on a display screen of one or more endpoints, the control unit operable to execute instructions to:
determine a state and configuration of an ongoing videoconference; and
access a route description corresponding to the state and configuration of the ongoing videoconference, the route description including a user created label describing a video image data stream destination, at least one user created label describing a video image data stream source for the video image data stream destination, and a user created label describing layout information determining the spatial arrangement of one or more video image data streams displayed on the video image data stream destination.

2. The system of claim 1, wherein:
wherein more than one route description is accessed that corresponds to the state and configuration of the ongoing videoconference for displaying at least one video image data stream on the display screen of the one or more endpoints.

3. The system of claim 1, further comprising:
a memory operatively coupled to the control unit and storing a plurality of route descriptions, wherein a route description is provided for each of a plurality of states and configurations of an ongoing videoconference and a video image data stream destination.

4. The system of claim 3, wherein the control unit is operable to execute instructions to:
update at least one route description of the plurality of route descriptions when a change in at least one of the state and configuration of an ongoing videoconference is determined, a change in at least one of the state and configuration of an ongoing videoconference comprising at least one of: an endpoint joining the ongoing videoconference, an endpoint leaving the ongoing videoconference, an endpoint going into an active state, and an endpoint going into an idle state.

5. The system of claim 1, wherein:
the control unit controls spatial arrangement of one or more video image data streams and at least one data stream; and
the layout information determines the spatial arrangement of one or more one video image data streams and at least one data stream displayed on the video image data stream destination.

6. A control unit comprising:
an interface for sending and receiving at least video data between two or more endpoints over a network; and
a control unit for controlling spatial arrangement of more than one video data stream displayed on a display screen of at least one endpoint, the control unit operable to execute instructions to:
determine a state and configuration of an ongoing videoconference; and
access at least one route description corresponding to the state and configuration of the ongoing videoconference, the route description comprising user created labels describing:
a video data stream destination;
at least one video data stream source corresponding to the video data stream destination; and
a layout description, the layout description label indicating the spatial arrangement of the at least one video data stream displayed on the destination.

7. The control unit of claim 6, further comprising:
a memory storing a plurality of route descriptions, wherein a route description is provided for each of a plurality of states and configurations of an ongoing videoconference and a video image data stream destination.

8. The control unit of claim 7, wherein the control unit is further operable to:
update at least one route description of the plurality of route descriptions when a change in at least one of the state and configuration of an ongoing videoconference is determined, a change in at least one of the state and configuration of an ongoing videoconference comprising at least one of: an endpoint joining the ongoing videoconference, an endpoint leaving the ongoing videoconference, an endpoint going into an active state, and an endpoint going into an idle state.

9. The control unit of claim 8, wherein:
the video image data stream destination is dependent upon the video image data stream destination of a selected route description; and
the video image data stream source is dependent upon the video image data stream source of the selected route description.

10. The control unit of claim 6, wherein the control unit is further operable to:
convert the video image data stream destination to a selected display screen of a selected endpoint; and
convert the more than one video image data stream source to more than one selected video image data stream from more than one selected remotely located endpoint.

11. The control unit of claim 10, wherein:
the control unit converts the layout description to layout data, the layout data including at least height and width coordinates for each video data stream displayed on at least one display screen of the selected endpoint.

12. The control unit of claim 6, wherein:
the control unit controls spatial arrangement of one or more video image data streams and at least one data stream; and
the layout description determines the spatial arrangement of one or more one video image data streams and at least one data stream displayed on the video image data stream destination.

13. A method comprising:
operating a programmed processor to determine at least one of state and configuration of an ongoing videoconference;
accessing one or more route descriptions stored in a memory operatively coupled to the programmed processor and corresponding to the determined state and configuration of the ongoing videoconference, a route description comprising at least one user created label describing a video data stream destination, one or more user created labels describing video data stream sources for the video data stream destination, and a user created label describing a spatial arrangement of one or more video data streams displayed on the destination; and
sending instructions to cause the display of one or more video data streams at the destination corresponding to the determined state and configuration of the ongoing videoconference.

14. The method of claim 13, further comprising:
providing a plurality of route descriptions, wherein a route description is provided for each of a plurality of states and configurations of videoconferences and video data stream destinations.

15. The method of claim 14, further comprising:
updating at least one route description of the plurality of route descriptions when a change in at least one of the state and configuration of an ongoing videoconference is determined, a change in at least one of the state and configuration of an ongoing videoconference comprising at least one of: an endpoint joining the ongoing videoconference, an endpoint leaving the ongoing videoconference, an endpoint going into an active state, and an endpoint going into an idle state.

16. The method of claim 13, further comprising:
converting the video data stream destination to a selected display screen of a selected endpoint;
converting the one or more video data stream sources to more than one selected video image data stream from more than one selected remotely located endpoint; and
converting the spatial arrangement of one or more video data streams displayed on the destination to layout data, the layout data including at least height and width coordinates for each video data stream displayed on at least one display screen of the selected endpoint.

17. The method of claim 13, further comprising:
displaying one or more video data streams and at least one data stream on the destination corresponding to the determined state and configuration of the ongoing videoconference.

18. A method comprising:
monitoring at least one of state and configuration of an ongoing videoconference, the videoconference comprising a near endpoint and at least one remote endpoint;
sending instructions to cause the display of at least one video data stream on a destination display screen determined by a route description, the route description comprising a user created label describing a video data stream destination, at least one user created label describing a video data stream source, and a user created label describing a layout description;
detecting a change in state or configuration of the ongoing videoconference; and
updating at least one route description corresponding to a current state and configuration of the ongoing videoconference, updating at least one route description, said updating further comprising:
determining a video data stream destination corresponding to the current state and configuration of the ongoing videoconference;
determining at least one video data stream source corresponding to the current state and configuration of the ongoing videoconference; and
updating the layout description for video data stream destination, wherein at least one video data stream is displayed on the destination display screen determined by the layout description.

19. The method of claim 18, further comprising:
converting the video data stream destination to a selected display screen of a selected endpoint; and
converting the at least one video data stream source to at least one selected video data stream from at least one selected remote endpoint; and
converting the layout description to layout data, the layout data including at least height and width coordinates for each video data stream displayed on the selected display screen of the selected endpoint.

20. The method of claim 19, further comprising:
providing a route description for each of a plurality of states and configurations of the ongoing videoconference.

* * * * *